United States Patent [19]

Daniels et al.

[11] 4,203,157
[45] May 13, 1980

[54] CARRY ANTICIPATOR CIRCUIT AND METHOD

[75] Inventors: R. Gary Daniels, Round Rock; Fuad H. Musa; Wm. Bryant Wilder, Jr., both of Austin; Michael F. Wiles, Round Rock, all of Tex.; Thomas H. Bennett, Scottsdale, Ariz.

[73] Assignee: Motorola, Inc., Schaumburg, Ill.

[21] Appl. No.: 939,724

[22] Filed: Sep. 5, 1978

[51] Int. Cl.² .............................................. G06F 7/50
[52] U.S. Cl. .................................................... 364/788
[58] Field of Search ........................ 364/788, 786, 784

[56] References Cited

U.S. PATENT DOCUMENTS

| | | | |
|---|---|---|---|
| 3,100,835 | 8/1963 | Bedrij | 364/788 |
| 3,100,836 | 8/1963 | Paul et al. | 364/788 |
| 3,316,393 | 4/1967 | Ruthazer | 364/788 |

OTHER PUBLICATIONS

Hallin et al., "Pipelining of Arithmetic Functions", IEEE Trans. on Computers, Aug. 1972, pp. 880–886.

Primary Examiner—David H. Malzahn
Attorney, Agent, or Firm—Marvin A. Glazer; Walter W. Nielsen

[57] ABSTRACT

A circuit and a method for adding an 8-bit operand to a 16-bit operand are disclosed such that the number of machine cycles required by a data processor to perform such an addition is reduced. The 8-bit operand and the least significant byte of the 16-bit operand are added together within an 8-bit adder circuit to generate the least significant byte of the result. Simultaneously, the most significant byte of the 16-bit operand is stored in a temporary register and is also input to an increment-/decrement network. The adder circuit, after a given delay time, generates a carry signal depending on whether a carry-out was produced by the addition. The carry signal and the sign bit of the 8-bit operand control the mode of operation of the increment/decrement network and determine whether the increment/decrement network or the temporary register will be selected to provide the most significant byte of the result.

11 Claims, 8 Drawing Figures

CARRY ANTICIPATOR CIRCUIT AND METHOD

CROSS REFERENCES TO RELATED APPLICATIONS

1. "Microcomputer" invented by Wiles et al, bearing Ser. No. 873,045, filed on Jan. 27, 1978 and assigned to the assignee of the present invention.
2. "Microprocessor" invented by Ritter et al, bearing Ser. No. 872,857, filed on Jan. 27, 1978 and assigned to the assignee of the present invention.
3. "Microprocessor Having Plural Internal Data Buses" invented by Daniels et al, bearing Ser. No. 939,741, filed on even date herewith and assigned to the assignee of the present invention.
4. "Programmable Mode Select By Reset" invented by Shaw et al bearing Ser. No. 939,721, filed on even date herewith and assigned to the assignee of the present invention.

TECHNICAL FIELD

This invention relates generally to adder circuitry and more particularly to an adder circuit adapted for use within an integrated circuit data processor.

BACKGROUND ART

Microprocessor devices are currently being used in a wide number of applications. As the speed of operation of microprocessor devices increases and as the cost of such devices decreases, the number of applications for such devices is extended. Typically, such microprocessor devices are coupled to a clock signal which is used to synchronize operations within the microprocessor device. The clock signal defines periodic processor cycles during which various internal operations take place. The microprocessor device operates under the control of a stored program which consists of a plurality of processor instructions. Generally, one or more processor cycles are required to fetch each instruction from the stored program and to implement each instruction. Thus, by reducing the number of processor cycles required to implement particular instructions, the overall speed of operation of a microprocessor device can be increased.

Many prior art microprocessor devices are designed to operate upon 8-bit data words and 16-bit address words. An example of one such prior art microprocessor device is the MC6800 microprocessor provided by Motorola, Inc. which is generally described in U.S. Pat. No. 4,030,079 "Processor Including Incrementer and Program Register Structure" issued to Bennett et al and assigned to the assignee of the present invention. The instruction set for this prior art microprocessor includes an addressing mode known as indexed addressing. In this mode, an 8-bit operand stored in the program memory is added to the contents of a 16-bit index register to generate the address of a memory location where an operand is stored. This prior art microprocessor also includes a mode of addressing known as relative addressing, typically used with branch instructions, wherein the address of the next instruction to be executed is computed by adding an 8-bit operand in the form of a 2's-complement number to the contents of a 16-bit program counter.

In prior art microprocessor devices that employ an 8-bit ALU (arithmetic-logic unit), instructions which require the addition of an 8-bit operand to a 16-bit operand are performed in the following manner. During a first processor cycle, the 8-bit operand and the least significant byte of the 16-bit operand are provided to the input ports of the 8-bit ALU to generate the least significant byte of the result. As is well known in the art, a byte equals 8 bits. The operation performed by the ALU may generate a carry-out if the 8-bit operand is a positive number, or it may indicate a borrow if the 8-bit operand is a 2's-complement negative number. In this case, the most significant byte of the 16-bit operand must be incremented or decremented accordingly. During a second processor cycle, the most significant byte of the 16-bit operand is transferred to an increment-/decrement network which modifies the most significant byte of the 16-bit operand if a carry or borrow occurred during the first processor cycle. Finally, during a third processor cycle, the most significant byte of the result has stabilized, and the 16-bit result can then be transmitted to the stored program memory to fetch an operand or a next instruction.

It will be appreciated by those skilled in the art that a circuit and a method for reducing the number of processor cycles required to perform the above described addition of an 8-bit operand to a 16-bit operand will result in faster overall speed of operation and represents a significant improvement over the prior art.

BRIEF SUMMARY OF THE INVENTION

It is an object of the present invention to reduce the number of processor cycles required by a microprocessor device in order to perform an arithmetic operation.

It is another object of the present invention to anticipate a carry or a borrow which may result from an arithmetic operation upon least significant operands while forming a least significant result in order to reduce the time required to compute a most significant result.

The foregoing and other objects and advantages of the present invention are obtained by providing an adder for adding a first operand to the least significant portion of a second operand in order to form the least significant portion of the result, while also providing increment/decrement circuitry for generating an incremented or decremented version of the most significant portion of the second operand. Additional circuitry is provided which is responsive to a carry-out signal generated by the adder and which may also be responsive to the sign bit of the first operand for selecting either the most significant portion of the second operand or the incremented or decremented version of the most significant portion of the second operand to be the most significant portion of the result.

BRIEF DESCRIPTION OF THE DRAWINGS

FIGS. 4A/4B is a logic diagram which illustrates a 1-bit slice through the high order increment/decrement network and the high order program counter register.

DETAILED DESCRIPTION OF THE INVENTION

Figure 1:
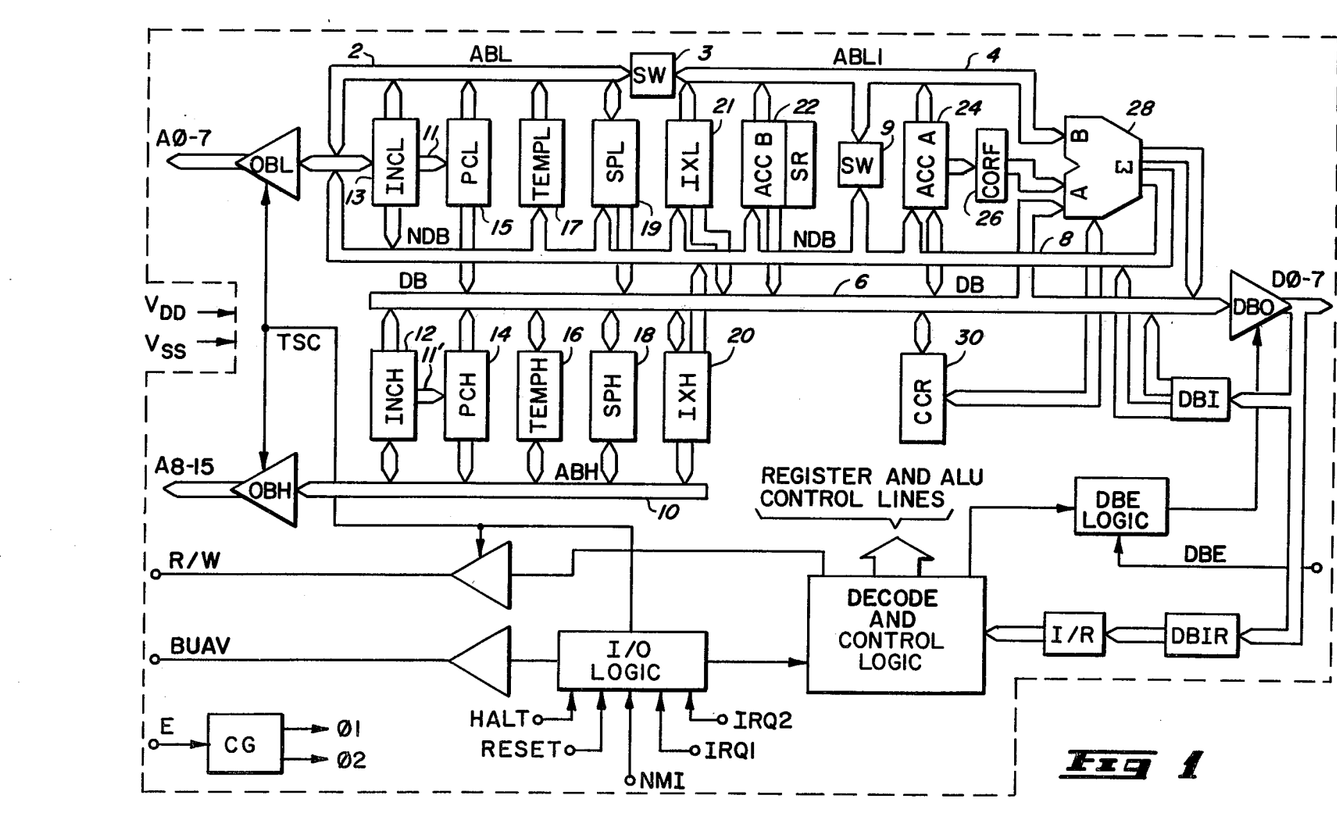
FIG. 1 is a block diagram which shows working registers, an ALU, and internal digital buses for a data processor.

The block diagram shown in FIG. 1 illustrates a plurality of internal working registers, an ALU, and several internal buses. The internal buses are used to transmit digital information among the internal working registers as well as to transmit digital information to and from other portions of the processor. A first low order address bus 2 (ABL) is eight bits wide and is shown being coupled to a switch 3 which, when closed, couples ABL bus 2 in series to a second low order address bus 4 (ABL1), which is also eight bits wide. A first data bus 6 (DB) and a second data but 8 (NDB) are each eight bits wide and are used to transmit data among the working registers and to input/output circuitry. A high order address bus 10 (ABH) is also eight bits wide such that the ABH bus 10 and ABL bus 2 are suitable for transmitting the high order byte and the low order byte, respectively, of a 16-bit address word.

A 16-bit increment/decrement network is formed by INCH block 12 in conjunction with INCL block 13 for incrementing the high order byte and low order byte, respectively, of a 16-bit word. A 16-bit program counter for storing the address of the next instruction to be executed is formed by high order register 14 and low order register 15, each of the registers having eight bits. The 8-bit result formed by INCH block 12 is coupled to the input of program counter register 14 by line 11', and the 8-bit result formed by INCL block 13 is coupled to the input of program counter register 15 by line 11. A 16-bit temporary register which is useful for temporarily storing data is formed by high order register 16 and low order register 17, each of the registers being eight bits wide. A 16-bit stack pointer is formed by high order register 18 and low order register 19, each of the registers being eight bits wide. The stack pointer may be used to address a portion of memory used to store return addresses for subroutines and for saving the contents of various registers when the processor is interrupted. A 16-bit index register is formed by high order register 20 and low order register 21, each of these registers being eight bits wide. A first accumulator 22 (ACCB) is an eight bit wide register and, in the preferred embodiment, includes logic gates (SR) which allow the contents of register 22 to be shifted to the right one bit position. A second accumulator 24 (ACCA) is also an eight bit wide register. Correction block 26 is coupled to ACCA 24 and is responsive to the contents of ACCA 24 for generating an eight bit correction factor. When added to the contents of ACCA 24, the eight bit correction factor allows the contents of ACCA 24 to be decimally corrected from straight binary format to binary coded decimal format. An arithmetic logic unit 28 (ALU) has a first input A which can be selectively coupled to either DB bus 6 or the output of correction block 26. A second input B is coupled to ABL1 bus 4. ALU 28 has an output terminal (Σ) which can be selectively coupled to either DB bus 6 or NDB bus 8. In addition a condition code register 30 is coupled to ALU 28 for recording various conditions generated by an ALU operation such as carry-borrow, overflow, result equal to zero, result negative, interrupt mask, and a half-carry from the least significant four bits of the result. The contents of the condition code register can then be tested to control various branch instructions. The details of the remainder of the circuitry shown in FIG. 1 are described in co-pending application "Microprocessor Having Plural Internal Data Buses" invented by Daniels et al, bearing Serial No. XXX,XXX, which is hereby incorporated by referenced.

Figure 2:
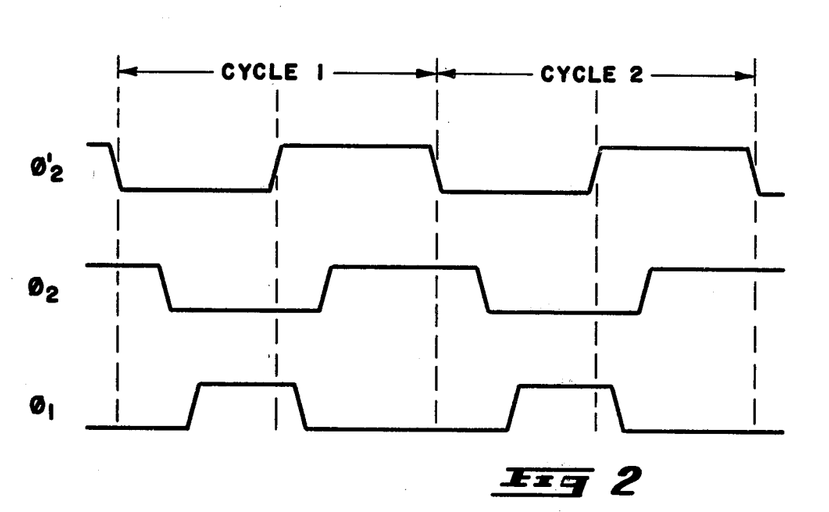
FIG. 2 is a timing diagram showing various processor clocking signals which define first and second processor cycles.

In FIG. 2, timing waveforms are shown for clock signals $\phi_2'$, $\phi_2$, and $\phi_1$ for first and second processor clock cycles. Referring again to FIG. 1, it will be assumed that during the two previous clock cycles, an instruction indicating indexed addressing was decoded and that the 8-bit offset to be added to the contents of the index register has been fetched from the program memory. During the first clock cycle following the previously mentioned clock cycles, the contents of IXL register 21 are enabled onto ABL1 bus 4 following the high to low transition of clock signal $\phi_2'$. ABL1 bus 4 transmits the contents of IXL register 21 to the B input of ALU 28. Simultaneously the 8-bit offset word previously fetched from the program memory is driven onto DB bus 6 for coupling to the A input of ALU 28. At the same time, the contents of IXH register 20 are enabled onto ABH bus 10 to transmit the high order byte of the index register. During this time, ABH bus 10 is enabled into both TEMPH register 16 and INCH block 12. After clock signal $\phi_2'$ switches from the low level to the high level, the internal buses are precharged to a high level to prepare for the transfer of data during the next clock cycle. While clock signal $\phi_2'$ is at the high level, ALU 28 performs the addition of the data received by the A and B inputs and forms an 8-bit sum. ALU 28 also provides a carry-out signal which indicates whether the addition generated a carry. Also while $\phi_2'$ is at the high level, INCH block 12 generates an 8-bit value which is one larger than the value received from ABH bus 10.

As clock signal $\phi_2'$ switches from a high to a low level, the second clock cycle begins and the 8-bit sum generated by ALU 28 is enabled onto NDB bus 8 which can be coupled to output buffer circuitry for transmission to the eight least significant address input ports of the program memory. Also while $\phi_2'$ is low during the second clock cycle, logic circuitry responsive to the carry-out signal generated by ALU 28 enables either the output of INCH block 12 or the output of TEMPH register 16 onto ABH bus 10 to supply the high order byte of the address which can be coupled to output buffer circuitry for transmission of the high order byte of the address to the program memory. If the carry-out signal generated by ALU 28 is a logic "0", then the value stored in the most significant byte of the index register need not be modified, and the contents of TEMPH register 16 are selected onto ABH bus 10. However, if the carry-out signal generated by ALU 28 is a logic "1", then the most significant byte of the index register should be one larger, and the incremented value produced by INCH block 12 is enabled onto ABH bus 10. Thus, only two processor clock cycles are required to generate the indexed address as compared to three clock cycles in the prior art.

In the previous example, the 8-bit offset to be added to the index register was an 8-bit unsigned value such that INCH block 12 is always selected to operate in the increment mode. However, relative addressing used for branch type instructions incorporates an 8-bit 2's-complement offset which can represent either a positive or negative offset to be added to the value stored by the program counter. For this type of instruction, INCH block 12 may be selected to operate in either the increment mode or the decrement mode as determined by the sign bit of the 2's-complement offset value. Again referring to FIGS. 1 and 2, assume that, during the previous two clock cycles, a branch instruction has been decoded by the processor and the 8-bit offset value has been fetched from the program memory. As clock signal $\phi_2'$ switches from a high to low level, the first clock cycle begins and the output of INCL block 13, which initially equals the value stored in PCL register 15, is enabled onto ABL bus 2. Switch 3 is closed which couples ABL bus 2 to ABL1 bus 4 to allow the output of INCL block 13 to be transmitted to the B input of ALU 28. At the same time, input circuitry drives the 8-bit 2'-complement offset, which was received from the program memory, onto DB bus 6 for transmission to the A input of ALU 28. Also at this time, the contents of INCH block 12 are enabled onto ABH bus 10, and the inputs to INCH block 12 and TEMPH register 16 are enabled to receive the high order byte of the program counter, since the value initially output by INCH block 12 equals the value stored by PCH register 14. The most significant bit of DB bus 6, which corresponds to the sign bit of the 2's-complement offset value, is used to select the increment or decrement mode of operation for INCH block 12. If the sign bit is a logic "0", then the offset value is positive and INCH block 12 will perform an increment; if the sign bit is a logic "1", then the offset value is negative and INCH block 12 will perform a decrement.

When clock signal $\phi_2'$ returns to the high level during the first clock cycle, the internal buses are precharged to prepare for the transmission of data during the second clock cycle. During this time, ALU 28 adds the 2'-complement offset to the least significant byte of the current address and generates an 8-bit result. ALU 28 also generates the carry-out signal during this time.

As clock signal $\phi_2'$ switches to a low level, the second clock cycle begins and, assuming that the conditions for the branch are met, the output Σ of ALU 28 is enabled onto NDB bus 8 for coupling to output buffer circuitry for transmission of the least significant byte of the branch address to the program memory. In order to determine the source of the most significant byte of the branch address, the carry-out signal generated by ALU 28 is exclusive-ORed with the sign bit of the 2's-complement offset value by gating circuitry which will be discussed hereinafter. If the exclusive-OR yields a logic "1", then the incremented or decremented value generated by INCH block 12 is enabled onto ABH bus 10; however if the exclusive-OR yields a logic "0", then the value saved in TEMPH register 16 is enabled onto ABH bus 10. Whichever value is selected is coupled by ABH bus 10 to output buffer circuitry for transmission of the high order byte of the branch address to the program memory.

Figure 3:
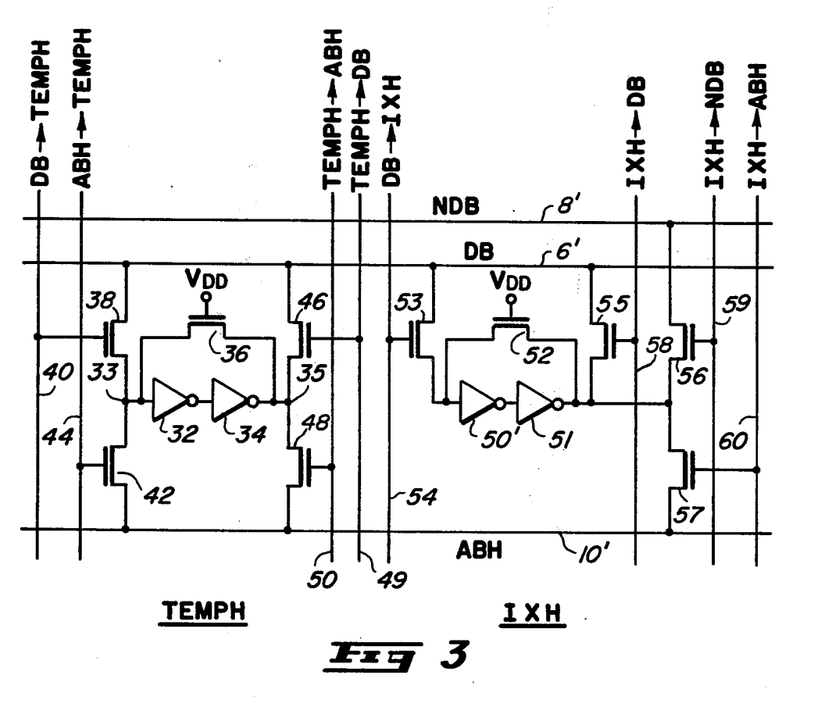
FIG. 3 is a circuit schematic illustrating one register cell for the high order temporary register and one register cell for the high order index register and interconnections to the internal processor buses.

In FIG. 3, one bit of TEMPH register 16 and one bit of IXH register 20 are illustrated together with the internal buses to which they are coupled. With regard to TEMPH register 16, a first inverter 32 has its input coupled to an input node 33. The output of inverter 32 is coupled to the input of inverter 34, and the output of inverter 34 is coupled to ouput node 35. A feedback coupling MOSFET 36 couples the output of inverter 34 to the input of inverter 32. The gate terminal of MOSFET 36 is coupled to the positive power supply terminal for receiving a positive supply voltage $V_{DD}$. Thus, inverter 32, inverter 34 and feedback MOSFET 36 form a latch circuit for storing one bit of information. As MOSFETs (metal-oxide-semiconductor field-effect transistors) are well-known in the art, the operation of these devices will not be described in further detail. For further details concerning the operation of MOSFET devices, see "Physics and Technology of Semiconductor Devices" by A. S. Grove, John Wiley and Sons, Inc., 1967.

Input node 33 is coupled by MOSFET 38 to one of the eight DB bus conductors 6'. The gate terminal of MOSFET 38 is coupled to conductor 40 which transmits a control signal generated by timing and decoding circuitry (not shown). When conductor 40 is at a high level, MOSFET 38 is enabled and the voltage at input node 33 is forced to correspond to the voltage on DB line 6'. Since MOSFET 38 has a much lower impedance than feedback MOSFET 36, MOSFET 38 will override MOSFET 36 in establishing the voltage at input node 33 whenever MOSFET 38 is enabled. Similarly, input MOSFET 42 couples input node 33 to one line 10' of the 8-bit ABH bus, and the gate terminal of MOSFET 42 is coupled to conductor 44 which, when at a high level, allows the voltage level on line 10' to be transferred to input node 33.

Output node 35 is coupled by MOSFET 46 to DB line 6', and output node 35 is also coupled by MOSFET 48 to ABH line 10'. When enabled by control conductors 49 or 50, MOSFET device 46 or 48 forces the DB line 6' or the ABH line 10', respectively, to assume the logic state stored by the TEMPH storage circuit. The logic circuitry used to generate the control signals conducted by control conductors 49 and 50 is discussed hereinafter.

The storage circuit for the IXH register shown in FIG. 3 operates in a similar manner. Inverter 50', inverter 51 and feedback MOSFET 52 again form a latching circuit. MOSFET 53 initializes the logic state stored by the IXH register to the logic state on DB line 6' when MOSFET 53 is enabled by the control signal conducted by conductor 54. The output of the IXH storage circuit can be coupled to DB line 6' by MOSFET 55, to NDB line 8' by MOSFET 56, or to ABH line 10' by MOSFET 57. MOSFET devices 55, 56 and 57 are enabled by control signals conducted by conductors 58, 59 and 60, respectively.

Figures 4A, 4B:
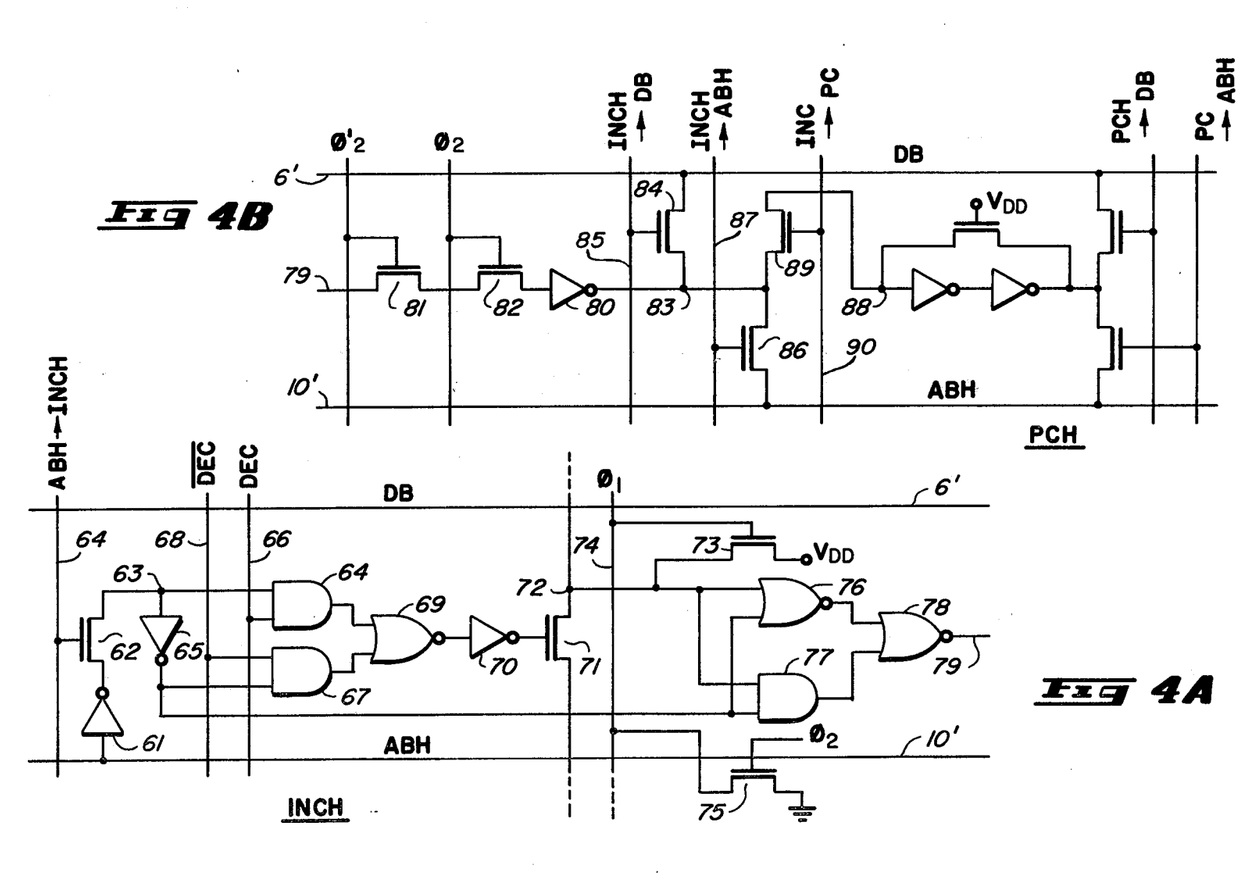

In FIGS. 4A/4B, a one-bit slice of INCH block 12 and PCH register 14 is shown including one line 6' of the DB bus 6 and one line 10' of the ABH bus 10. The input of inverter 61 is coupled to ABH line 10', and MOSFET 62 couples the output of inverter 61 to node 63. The gate terminal of MOSFET 62 is coupled to conductor 64 which is used to conduct a control voltage generated by logic circuitry (not shown), and MOSFET 62 is enabled when the voltage level conducted by conductor 64 is at a high level. Node 63 is coupled to a first input of AND gate 64 and also to the input of inverter 65. A second input of AND gate 64 is coupled to DEC line 66. The output of inverter 65 is coupled to a first input of AND gate 67, and the second input of AND gate 67 is coupled to $\overline{DEC}$ line 68. The logic circuitry which generates the control signals for DEC line 66 and $\overline{DEC}$ line 68 will be discussed later with reference to FIG. 7. The outputs of AND gate 64 and 67 are received by the two inputs of NOR gate 69 such that either the true or complement form of the signal received by the input of inverter 61 is selected at the output of NOR gate 69. Those skilled in the art will recognize that the output of gate 70 is the Exclusive-OR function of the DEC signal and the data on ABH line 10'. In the increment mode, AND gate 67 is enabled, while in the decrement mode AND gate 64 is enabled. The output of NOR gate 69 is coupled to the input of inverter 70 and the output of inverter 70 is coupled to the gate terminal of MOSFET 71.

One terminal of MOSFET 71 is coupled to node 72 which is coupled to one terminal of precharge MOSFET device 73. Node 72 is also coupled to a terminal of a MOSFET device (not shown) in the next least significant bit stage of INCH block 18. The other terminal of MOSFET 71 is coupled to the terminal of a MOSFET device (not shown) in the next most significant bit stage of INCH block 18. Thus, MOSFET 71 and other MOSFET devices within the other bit stages of INCH block 18 form a series connected path.

The gate terminal of precharge MOSFET device 73 is coupled to conductor 74, and the third terminal of MOSFET 73 is coupled to the positive supply terminal $V_{DD}$. Conductor 74 is coupled to clock signal $\phi_1$ (see FIG. 2) and to the drain of MOSFET 75 which has its source coupled to ground potential and its gate coupled to clock signal $\phi_2$. When clock signal $\phi_1$ goes to a high level while clock signal $\phi_2$ is at a low level, MOSFET 75 is disabled and conductor 74 is at a high level. MOSFET 73 is then enabled and couples node 72 to the positive supply voltage. Similarly corresponding nodes in other bit stages in the series connected path are also precharged to a high level.

In performing an increment or decrement operation, a node corresponding to node 72 in the least significant bit stage is coupled to ground potential after clock signal $\phi_2$ goes high and the precharge MOSFETS have been disabled. A MOSFET device corresponding to MOSFET 71 in the least significant bit stage will propagate the ground potential along the series connected path towards the most significant bit stage provided that the gate terminal of the corresponding MOSFET device is at a high level. Whenever a gate terminal of one of the series connected MOSFET devices is at a low level, the propagation of the ground potential along the series connected path terminates and the subsequent nodes remain at the precharged high level. Those skilled in the art will recognize the above-described circuitry as a series carry circuit or low-level ripple carry circuit.

Node 72 is also coupled to a first input of NOR gate 76 and a first input of AND gate 77. The second input of NOR gate 76 and the second input of AND gate 77 are coupled to the output of inverter 65 which corresponds to the logic state of the signal received at the input of inverter 61. The output of NOR gate 76 is coupled to a first input of NOR gate 78 while the second input of NOR gate 78 is coupled to the output of AND gate 77. Those skilled in the art will realize that the output of NOR gate 78 is logically the exclusive-OR of the logic levels provided by node 72 and the output of inverter 65.

The output of NOR gate 78 is coupled to the input of inverter 80 by series-connected MOSFET devices 81 and 82. The gate terminal of MOSFET 81 is controlled by clock signal $\phi_2'$ while the gate terminal of MOSFET 82 is controlled by clock signal $\phi_2$. Referring to FIG. 2, $\phi_2'$ is at a high level during the second half of the first clock cycle and switches to a low level when the second clock cycle begins. Similarly clock signal $\phi_2$ switches to a low level shortly after the second clock cycle begins such that the result of the increment or decrement operation, formed during the first clock cycle, is dynamically stored at the input of inverter gate 80 for use during the second clock cycle. The output of inverter gate 80 is coupled to an output node 83 which corresponds to the output of the particular bit stage for INCH block 12. Node 83 can be coupled to DB line 6' by MOSFET 84 which has its gate terminal coupled to conductor 85. Output node 83 can also be coupled to ABH line 10' by MOSFET 86 which has its gate terminal coupled to conductor 87. The logic circuitry for generating the control signals conducted by conductors 85 and 87 will be discussed later with reference to FIG. 7. Output node 83 can also be coupled to the input node 88 of one bit stage of PCH register 14 by MOSFET 89. The gate terminal of MOSFET 89 is coupled to conductor 90 which assumes a high level whenever a transfer from INCH block 12 to PCH register 14 is desired. The PCH register is similar to the TEMPH and IXH registers already described with reference to FIG. 3, and it will not be further described.

Figure 5:
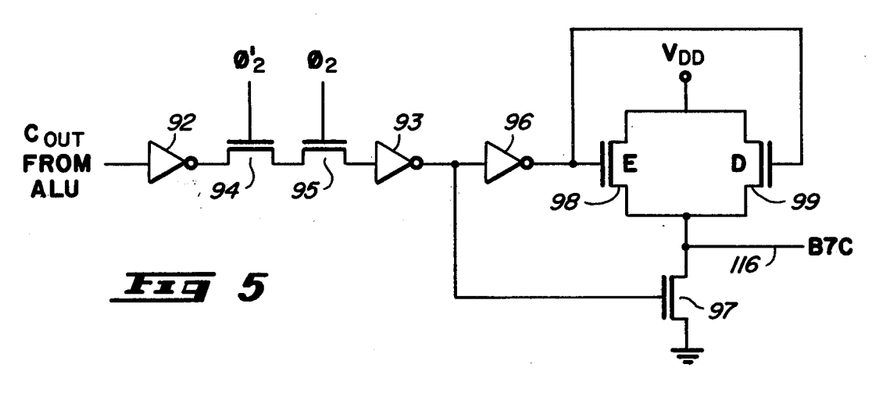
FIG. 5 is a circuit schematic showing circuitry used to buffer a carry-out signal which is output by the ALU.

In FIG. 5, a buffer circuit is shown for establishing a control signal based upon the carry-out signal developed by ALU 28. Referring again to FIG. 2, the carry-out signal from ALU 28 is generated during the second half of the first clock cycle when clock signal $\phi_2'$ is at a high level. The carry-out signal is generated by a series-carry circuit within ALU 28 similar to the one described within INCH block 12 with reference to FIGS. 4A/4B. The carry-out signal is received by the input of inverter 92 which has its output coupled to the input of inverter 93 by series-connected MOSFET devices 94 and 95. The gate terminal of MOSFET 94 is coupled to clock signal $\phi_2'$ while the gate terminal of MOSFET 95 is coupled to the clock signal $\phi_2$. When the second clock cycle begins, clock signal $\phi_2'$ goes to a low level and MOSFET 94 is cut off. Similarly, shortly after the second clock cycle begins, clock signal $\phi_2$ goes to a low level and MOSFET 95 is cut off, and the carry-out signal, generated by ALU 28 during the first clock cycle, is dynamically stored on the input of inverter 93 for use during the second clock cycle. The output of inverter 93 is coupled to the input of inverter 96 and to the gate terminal of MOSFET device 97. The source of MOSFET 97 is coupled to ground potential, and the drain of MOSFET 97 is coupled to the source of enhancement mode MOSFET 98 and to the source of depletion mode MOSFET device 99. The output of inverter 96 is coupled to the gate terminals of MOSFETS 98 and 99, while the drain terminals of MOSFETS 98 and 99 are coupled to the positive supply terminal $V_{DD}$. Conductor 116 is coupled to the drain of MOSFET 97 for conducting control signal B7C.

Figure 6:
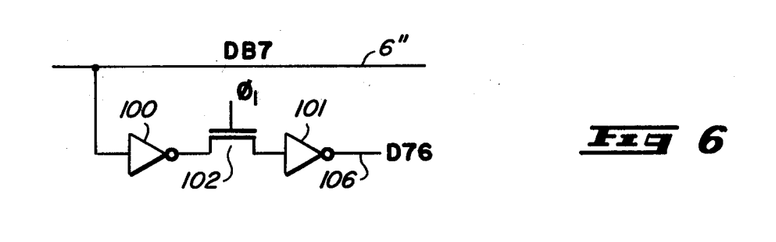
FIG. 6 is a circuit schematic showing circuitry used to buffer the most significant bit or sign bit transmitted by the data bus.

In FIG. 6, a buffer circuit is shown for developing a control signal DB7 corresponding to the sign bit of the offset value input to ALU 28 during the first clock cycle. The DB7 line 6" is the most significant bit line of DB bus 6. DB7 line 6" is coupled to the input of inverter 100 which has its output coupled to the input of inverter 101 by MOSFET 102. The gate terminal of MOSFET 102 is coupled to clock signal $\phi_1$ which is at a high level while the data bus is enabled during the first clock cycle but which switches to a low level before clock signal $\phi_2$ rises to a high level and precharges the internal processor buses. Thus the status of DB7 line 6" is dynamically stored at the input of inverter 101. The output of inverter 101 provides a control signal D76 which corresponds to the polarity of the sign bit of the offset value.

Figure 7:
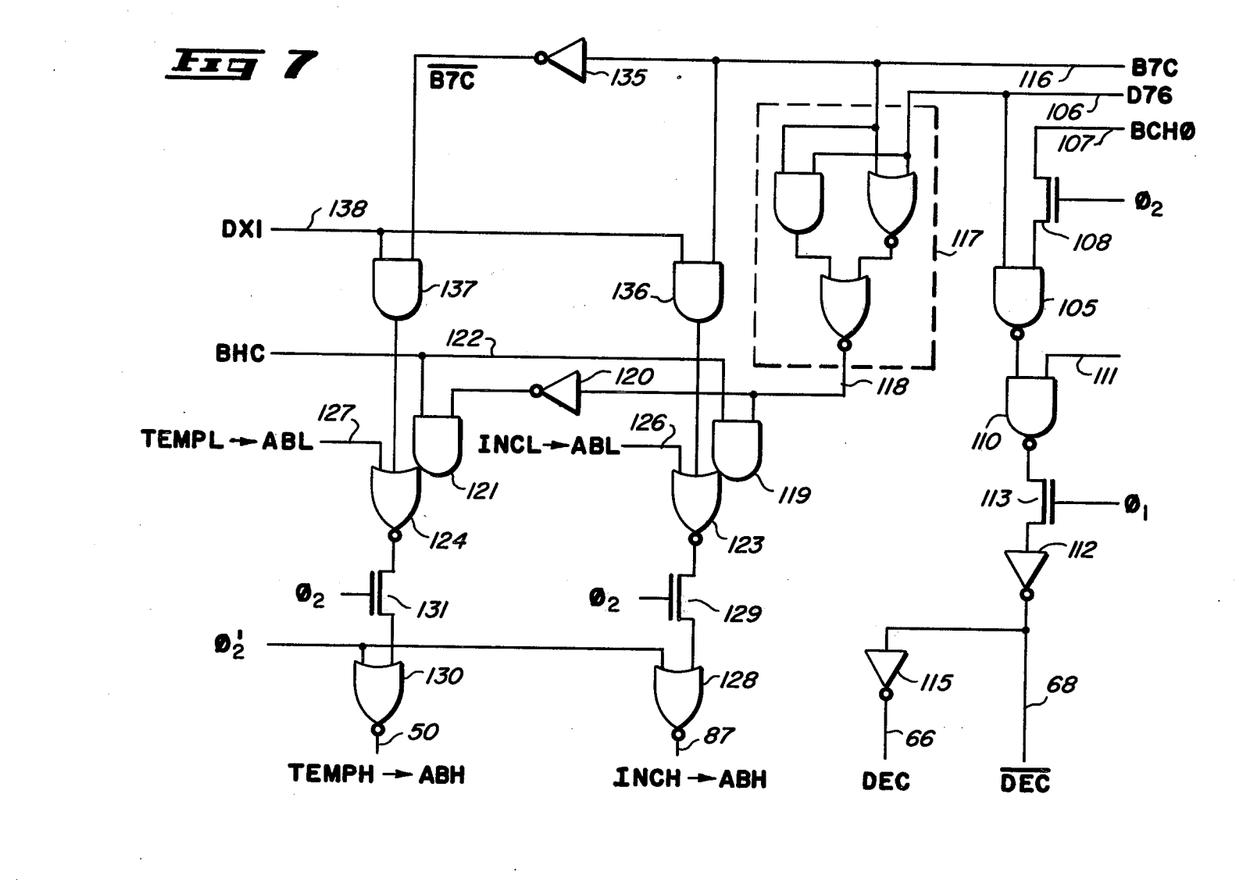
FIG. 7 is a logic diagram which illustrates the generation of various control signals which determine the selection of the most significant byte of the result for an arithmetic operation.

FIG. 7 is a logic diagram which shows the logic circuitry used to develop the DEC and $\overline{DEC}$ control signals for controlling INCH block 12 as well as the logic circuitry used to develop the control signals which enable either the output of INCH block 12 or the output of TEMPH register 16 onto ABH bus 10. Conductor 106 receives the D76 control signal already discussed with reference to FIG. 6. Conductor 106 is coupled to a first input of NAND gate 105. Conductor 107 conducts a control signal BCH0 which is generated by instruction decoder circuitry (not shown) and which assumes a high level whenever a branch instruction is received by the data processor. MOSFET 108 couples conductor 107 to a second terminal of gate 105. The gate terminal of MOSFET 108 is coupled to clock signal $\phi_2$, and the status of the BCH0 control signal is dynamically stored on the second input of gate 105 shortly after the first clock cycle begins when clock signal $\phi_2$ switches to a low level. The output of gate 105 is coupled to a first input of NAND gate 110. The output of gate 105 will always be a logic "1" unless a branch instruction is being executed in which case the output of gate 105 is the complement of the D76 control signal.

A second input of gate 110 is coupled to conductor 111 which is coupled to other decoder circuitry (not shown). Conductor 111 is at a logic "1" level whenever a branch instruction is being executed such that the status of the D76 control signal will control the output of gate 110. A control signal conducted by conductor 111 may be used to select either the increment or decrement mode of operation for INCH block 12 for instructions other than branch instructions. For example, conductor 111 may be a logic "0" level to select the decrement mode of operation in order to perform a decrement-index-register instruction. Alternately, conductor 111 would be at a logic "1" level to select the increment mode of operation for INCH block 12 during the execution of an increment-index-register instruction.

The output of gate 110 is coupled to the input of inverter 112 by MOSFET 113. The gate terminal of MOSFET 113 is coupled to clock signal $\phi_1$. Referring to FIG. 2, clock signal $\phi_1$ switches to a low logic level during the second half of the first clock cycle such that the output level of gate 110 is dynamically stored on the input of inverter 112 following the high to low transition of clock signal $\phi_1$. It will be recalled that the increment or decrement operation begins after clock signal $\phi_2$ goes high and the incrementor precharge devices are disabled. The output of inverter gate 112 is coupled to conductor 68 to provide the $\overline{DEC}$ signal and is also coupled to the input of inverter 115. The output of inverter 115 is coupled to conductor 66 to provide the DEC signal. Assuming that a branch instruction is being executed, and assuming that the 8-bit offset value is a positive number, then D76 will be a logic "0", and control signal DEC will also be a logic "0". However if the offset value is a negative number, then D76 will be a logic "1" and control signal DEC will also be a logic "1" in order to select the decrement mode of operation.

Conductor 116 receives the control signal B7C as discussed with reference to FIG. 5. Conductors 116 and 106 are coupled to logic circuitry within dashed block 117 which produces an output on conductor 118. Those skilled in the art will recognize that the output of dashed block 117 is the exclusive-OR of control signals B7C and D76. Conductor 118 is coupled to a first input of AND gate 119 and to the input of inverter 120, the output of which is coupled to a first input of AND gate 121. The second input of AND gate 119 and the second input of AND gate 121 are coupled to conductor 122 which conducts a control signal BHC. The logic equation for control signal BHC is the following:

BHC=BCH1·(BRANCH+BSR).

Referring to FIG. 2, control signal BCH1 is a logic "1" during the second clock cycle only if previously mentioned control signal BCH0 is a logic "1" during the first clock cycle to indicate that a branch instruction has been decoded by the data processor. Control signal BRANCH is a logic "1" during the second clock cycle whenever the condition for the BRANCH has been met. For example, if a BEQ (branch if equal to zero) instruction is being executed, and if a flag in condition code register 30 indicates that the result of the most recent ALU operation was equal to zero, then BRANCH is equal to a logic "1". Control signal BSR is a logic "1" whenever a branch-to-subroutine instruction is being executed. Thus control signal BHC is a logic "1" during the second clock cycle only when a branch will actually occur, i.e., only when the address of the next instruction is different from the address specified by the program counter.

Conductor 116, which conducts control signal B7C, is also coupled to the input of inverter 135 and to a first input of AND gate 136. The output of inverter 135 $\overline{B7C}$ is coupled to a first input of AND gate 137. The second input of AND gate 136 and the second input of AND gate 137 are coupled to conductor 138 which conducts control signal DX1 which is generated by instruction decoder circuitry (not shown). Referring again to FIG. 2, control signal DX1 is a logic "1" level during the second clock cycle whenever the decoder circuitry detects that an instruction which uses indexed addressing is being executed.

The output of gate 119 and the output of gate 136 are coupled to first and second inputs, respectively, of NOR gate 123 which has a third input coupled to conductor 126. Similarly, the output of gate 121 and the output of gate 137 are coupled to first and second inputs, respectively, of NOR gate 124 which has a third input coupled to conductor 127. The output of gate 123 is coupled to a first input of NOR gate 128 by MOSFET device 129. Similarly, the output of gate 124 is coupled to a first input of NOR gate 130 by MOSFET device 131. The gate terminal of MOSFET 129 and the gate terminal of MOSFET 131 are connected to clock signal $\phi_2$. The second input of gate 128 and the second input of gate 130 are coupled to clock signal $\phi_2'$. The output of gate 128 is coupled to conductor 87 for selectively enabling the output of INCH block 12 onto ABH bus 10 as illustrated in FIG. 4. Similarly, the output of gate 130 is coupled to conductor 50 for enabling the output of TEMPH register 16 onto ABH bus 10 as illustrated in FIG. 3.

Assuming that a branch instruction is being executed and that the conditions for the branch have been met, then conductor 122 is a logic "1" level and conductor 138 is a logic "0" level during the second clock cycle. Since no branch instruction uses indexed addressing, control signal DX1 is a logic "0" level at this time. It is also assumed that conductors 126 and 127 are at a logic "0" level during the execution of a branch instruction. If control signal B7C is a logic "1", indicating that a carry-out was generated during the addition of the low order byte operands, and if control signal D76 is a logic "0", indicating that the 8-bit offset value is a positive number, then conductor 118 is at a logic "1" level. In this case, gate 119 is enabled and gate 121 is disabled such that the output of gate 123 is a logic "0" and the output of gate 124 is a logic "1". The output of gate 123 is dynamically stored on the first input of gate 128 when clock signal $\phi_2$ switches to a logic "0" level shortly after the second clock cycle begins. Similarly, the logic level output by gate 124 is dynamically stored on the first input of gate 130 when clock signal $\phi_2$ switches to a low level. Immediately before the second clock cycle begins, clock signal $\phi_2'$ is at a logic "1" level which forces conductor 87 and conductor 50 to a low level. It will be recalled that during this time, ABH bus 10 is being precharged to a high level. When the second clock cycle begins, signal $\phi_2'$ switches to a low level, enabling gates 128 and 130. In the example where B7C is a logic "1" and D76 is a logic "0", conductor 87 now switches to a logic "1" level to select the output of INCH block 12 onto to ABH bus 10, while conductor 50 remains at a logic "0" level.

During the execution of an instruction which employs an indexed mode of addressing, conductor 138 is a logic "1" while conductor 122 is a logic "0" level. Since no branch instruction uses indexed addressing, control signal BHC is a logic "0" level at this time. It is also assumed that conductor 126 and conductor 127 are at a logic "0" level. Assuming that control signal B7C is a logic "1" level, indicating a carry-out from the addition from the low order operands, then the output of gate 123 is a logic "0" level while the output of gate 124 is a logic "1" level. When the second clock cycle begins, and signal $\phi_2'$ switches to a low level, then conductor 87 switches to a logic "1" level to select the output of INCH block 12 onto ABH bus 10 while conductor 50 remains at a logic "0" level.

Conductor 126 and conductor 127 are coupled to other decoder circuitry (not shown) for allowing INCH block 12 and TEMPH register 16, respectively, to drive ABH bus 10 for instructions other than those involving indexed or relative addressing.

While the invention has been described with reference to a preferred embodiment, the description is for illustrative purposes only and is not to be construed as limiting the scope of the invention. Various modifications and changes may occur to those skilled in the art without departing from the true spirit and scope of the invention as defined in the appended claims.

We claim:

1. A carry anticipator circuit suitable for use within a data processor for reducing the time required to perform arithmetic operations, comprising:
    (a) first means for providing a first digital signal having a first predetermined number of bits;
    (b) second means for providing a second digital signal having a second predetermined number of bits, the second predetermined number being greater than the first predetermined number, the second digital signal being provided as a most significant group and a least significant group of bits, the least significant group having the first predetermined number of bits, and the most significant group of bits corresponding to a first binary value;
    (c) arithmetic means having first input means coupled to the first means for receiving the first digital signal and second input means coupled to the second means for receiving the least significant group of bits, the arithmetic means performing an arithmetic operation upon the bits received by the first and second input means to provide a least significant result having the first predetermined number of bits, the arithmetic means also providing a carry signal for indicating whether a carry-out resulted from the operation performed by the arithmetic means;
    (d) third means coupled to the second means for receiving the most significant group of bits and for providing an incremented group of bits, the incremented group of bits corresponding to a second binary value which is one larger than the first binary value; and
    (e) fourth means coupled to the third means for receiving the incremented group of bits and coupled to the second means for receiving the most significant group of bits, the fourth means being responsive to the carry signal for selecting either the most significant group of bits or the incremented group of bits and providing the selected bits as a most significant result.

2. A carry anticipator circuit as recited in claim 1 wherein the second predetermined number is equal to twice the first predetermined number such that the most significant group of bits has the first predetermined number of bits.

3. A carry anticipator circuit as recited in claim 1 wherein the arithmetic means includes a binary adder circuit suitable for adding two binary words to provide the least significant result, each of the binary words having the first predetermined number of bits, the binary adder circuit also being suitable for providing the carry signal as a first logic level when an addition of the two binary words generates a carry-out and as a second logic level when the addition does not generate a carry-out.

4. A carry anticipator circuit as recited in claim 3 wherein the fourth means comprises a temporary register and a digital bus, the temporary register temporarily storing the most significant group of bits, and the digital bus being coupled to the temporary register and to the third means for transmitting the selected bits.

5. A carry anticipator circuit as recited in claim 4 wherein the fourth means selects the most significant group of bits from the temporary register onto the digital bus when the carry signal is at the second logic level and selects the incremented group of bits from the third means onto the digital bus when the carry signal is at the first logic level.

6. A carry anticipator circuit as recited in claim 1 further comprising a means for generating clocking signals for effecting first and second clock cycles, the first clock cycle occurring prior to the second clock cycle, the arithmetic means and third means being operative during the first clock cycle to provide the least significant result and the incremented group of bits, respectively, and the fourth means being operative during the second clock cycle to provide the most significant result.

7. A method of adding a first operand having m bits to a second operand having m+n bits grouped as a least significant group of m bits and a most significant group of n bits, the method comprising the steps of:

(a) adding the first operand and the least significant group in an m-bit adder circuit for generating a least significant result having m bits and a carry signal for indicating whether a carry-out occurred;

(b) storing the most significant group of bits in a register;

(c) modifying the most significant group of bits to form a modified group of n bits, the modifying step including the step of selectively incrementing the most significant group of bits in an incrementer circuit to form an incremented group of bits; and (d) selecting either the most significant group of bits stored in the register or the modified group of bits to provide a most significant result having n bits, the selection being a function of the carry signal.

8. The method of claim 7 wherein the first operand includes a sign bit for indicating both positive and negative magnitudes, the modifying step including the step of selectively decrementing the most significant group of bits in a decrement circuit to form a decremented group of bits, the selection of the incrementing or decrementing steps being determined by the sign bit of the first operand.

9. The method of claim 8 wherein the step of selecting the most significant group or the modified group of bits is also a function of the sign bit of the first operand.

10. A carry anticipator circuit suitable for use within a data processor for reducing the time required to perform arithmetic operations, comprising:

(a) first means for providing a first digital signal having a first predetermined number of bits, the first digital signal including a most significant bit having a first and a second logic level, the most significant bit being at the first logic level when the first digital signal is positive and being at the second logic level when the first digital signal is negative;

(b) second means for providing a second digital signal having a second predetermined number of bits, the second predetermined number being greater than the first predetermined number, the second digital signal being provided as a most significant group and a least significant group of bits, the least significant group having the first predetermined number of bits, and the most significant group of bits corresponding to a first binary value;

(c) arithmetic means having a first input coupled to the first means for receiving the first digital signal and a second input coupled to the second means for receiving the least significant group of bits, the arithmetic means performing an arithmetic operation upon the bits received by the first and second inputs to provide a least significant result having the first predetermined number of bits, the arithmetic means also providing a carry signal for indicating whether a carry-out resulted from the operation performed by the arithmetic means;

(d) third means coupled to the second means for receiving the most significant group of bits and being responsive to the most significant bit of the first digital signal for selectively providing an incremented group of bits when the most significant bit is at the first logic level and providing a decremented group of bits when the most significant bit is at the second logic level, the incremented group of bits corresponding to a second binary value which is one larger than the first binary value and the decremented group of bits corresponding to a third binary value which is one smaller than the first binary value; and (e) fourth means coupled to the second means for receiving the most significant group of bits and coupled to the third means for receiving the incremented or decremented group of bits, the fourth means being responsive to the carry signal and responsive to the most significant bit of the first digital signal for selecting either the most significant group of bits or the incremented or decremented group of bits and providing the selected bits as a most significant result.

11. A carry anticipator circuit as recited in claim 10 further comprising a means for generating clocking signals for effecting first and second clock cycles, the first clock cycle occurring prior to the second clock cycle, the arithmetic means and third means being operative during the first clock cycle to provide the least significant result and the incremented or decremented group of bits, respectively, and the fourth means being operative during the second clock cycle to provide the most significant result.

* * * * *